United States Patent [19]

Phillips

[11] Patent Number: 5,711,345
[45] Date of Patent: Jan. 27, 1998

[54] METHOD AND APPARATUS FOR FORMING A CONTROL VALVE FOR HYDRAULIC CIRCUITS

[75] Inventor: Edward H. Phillips, Troy, Mich.

[73] Assignee: Techco Corporation, Southfield, Mich.

[21] Appl. No.: 577,415

[22] Filed: Dec. 22, 1995

[51] Int. Cl.⁶ .................. F15B 13/04; F15B 9/10
[52] U.S. Cl. .................. 137/625.23; 91/375 A; 137/625.24
[58] Field of Search .............. 91/375 A; 137/625.23, 137/625.24; 180/428

[56] References Cited

U.S. PATENT DOCUMENTS

| | | |
|---|---|---|
| 3,456,317 | 7/1969 | Fritsch . |
| 4,919,023 | 4/1990 | Bloink . |
| 5,492,191 | 2/1996 | Birsching ............. 91/375 A X |

OTHER PUBLICATIONS

Pages from Wera brochure (undated).

*Primary Examiner*—Gerald A. Michalsky
*Attorney, Agent, or Firm*—Gifford, Krass, Groh, Sprinkle, Patmore, Anderson & Citkowski, P.C.

[57] ABSTRACT

Methods and machining apparatus for indexing and forming spool and pinion shafts for use in a rotary control valve of a power steering system are disclosed. In particular, the methods include forming a contoured spool shaft extension on an end of a spool shaft and a complementary rosette on an end of a pinion shaft, and forming spool and pinion shaft holders having complementary rosettes and contoured ends, respectively, to permit accurate mounting of the spool and pinion shafts during subsequent machine operations. The machining apparatus includes a workpiece holder which rotates the spool or pinion shaft at a predetermined speed and a cutting assembly which moves a cutting tool into and out of contact with the workpiece at three times the speed of rotation of the workpiece.

3 Claims, 7 Drawing Sheets

METHOD AND APPARATUS FOR FORMING A CONTROL VALVE FOR HYDRAULIC CIRCUITS

BACKGROUND OF THE INVENTION

I. Field of the Invention

The present invention relates to a control valve as well as a method and apparatus for forming a control valve for hydraulic circuits, and more particularly, to spool and pinion shafts and methods and apparatus for forming the spool and pinion shafts of a control valve for use in hydraulically actuated power steering systems.

II. Description of the Prior Art

Hydraulically actuated power steering systems having control valves are well known. These systems typically have a steering shaft which is connected to a control valve, a steering gear assembly and a power cylinder. The power cylinder is usually configured as a double-acting cylinder which is mechanically linked to the steering gear assembly. The power cylinder provides steering assist in the form of hydraulically derived steering force. The control valve includes a spool shaft and sleeve which are axially rotatable with respect to each other in response to steering input torque to control the degree of hydraulic power assist. The degree of steering assist is controlled by progressive overlapping of slots formed in the sleeve and grooves formed in the spool shaft. The progressive overlapping is produced by differential positioning of the spool shaft and sleeve as discussed in U.S. Pat. No. 5,435,698.

The contour of the slots and grooves can be quite complex in order to provide the proper amount of steering assist with respect to valve deflection. It is necessary, therefore, to precisely machine the slots and grooves which form the orifices to provide the desired contour, such as grooves which have metering ramps which extend in a normal direction to the longitudinal axis of a slot.

Often, the spool shafts are machined and hardened prior to forming the grooves. Formation of such grooves and metering ramps is then done by a tooling process wherein both grooves and metering ramps are ground in sequential operations in a single chucking of the spool shaft. This is typically accomplished in a specially constructed machine tool known as a "C-axis" grinding machine. Of the two operations, forming the grooves is the most time consuming because it involves a plunge grinding operation.

This process, involving grinding both grooves and metering ramps in sequential operations in a single chucking of the spool shaft, is required because it is not possible to adequately index the spool shafts so that separate machining of the grooves before hardening, and grinding of the metering ramps after hardening can be accomplished. That is to say, it is not possible to execute these operations on separate machines and achieve acceptable rotational alignment therebetween. Accordingly, because of the excess time involved in forming the grooves, currently known methods of formation of such complex contours on spool shafts are quite expensive.

In addition, there are a number of other features formed upon a spool shaft that must be appropriately indexed with reference to the grooves and metering ramps. These include stop teeth used for mechanically driving the control valve's pinion shaft in the event of hydraulic system failure as well as various holes and features such as those engaged by the power steering system's steering shaft. Further, the hole for mounting the sleeve drive pin formed in the pinion shaft as well as the pinion gear itself must be indexed with respect to the stop teeth, and as a result, held in angular relationship to the grooves and metering ramps of the spool shaft.

SUMMARY OF THE INVENTION

Accordingly, the primary object of the present invention is to provide an improved master indexing method and apparatus for forming the spool and pinion shafts of a rotary control valve with reference to consistant part mounting positions. The improved method is economical, and in particular, provides the ability to effectively produce grooves and metering ramps having complex shapes on separate machines.

Accordingly, the method of indexing and forming a spool shaft for a control valve in accordance with the invention includes the steps of forming a spool shaft blank comprising a spool shaft extension extending from one end thereof, forming a plurality of notches comprising root filets in the spool shaft extension, forming complementary rosettes comprising seats configured for meshing with the root filets on sequentially utilized spool shaft holders, mounting a portion of the spool shaft holders in machine tools to be used in machining the spool shaft prior to hardening, mounting and remounting the valve spool shaft in the sequentially utilized spool shaft holders with the root filets and seats meshing together, performing sequential machining operations upon the spool shaft including forming axially extending portions of the grooves, hardening the spool shaft, mounting another of the spool shaft holders in a cylindrical grinding machine, re-mounting the valve spool shaft in that spool shaft holder with the root filets and seats meshing together, grinding the fundamental cylindrical shape of the spool shaft, mounting the final one of the spool shaft holders in a "C-axis" grinding machine, re-mounting the valve spool shaft in that spool shaft holder with the root filets and seats meshing together, and finally, grinding the metering ramps.

Also accordingly, the method of indexing and forming a complementary pinion shaft for a control valve in accordance with the invention includes the steps of forming a pinion shaft blank, forming a rosette having a plurality of arms comprising seats that are complementary to a mating set of notches formed upon a spool shaft in a juxtaposed end of the pinion shaft, forming a complementary plurality of notches comprising corners on sequentially utilized pinion, shaft holders, mounting a portion of the pinion shaft holders in machine tools to be used in machining the pinion shaft prior to hardening, mounting and re-mounting the pinion shaft upon the sequentially utilized pinion shaft holders with the seats and corners meshing together, performing required sequential machining operations on the pinion shaft, hardening the pinion shaft, mounting the final one of the pinion shaft holders in a cylindrical grinding machine, re-mounting the pinion shaft upon that pinion shaft holder with the seats and corners meshing together, and grinding required cylindrical shapes upon the pinion shaft.

Also disclosed is a method and apparatus for forming the plurality of notches in the spool shaft extension, the rosette having a like number of arms in the end of the pinion shaft, and the complementary rosette on the spool shaft holders and complementary notches on the pinion shaft holders. The apparatus includes a primary driveshaft driven by a motor, a workpiece holding assembly and a cutting assembly. The workpiece holding assembly includes a holding device which is rotated at a predetermined speed by a fine worm wheel driven by a fine worm shaft which, in turn, is driven by the primary drive shaft via another worm wheel. The cutting assembly has an orbiting machining spindle mounted cutting tool, which orbiting machining spindle is offset from the center of rotation of a coarse worm wheel driven by a coarse worm shaft, which in turn, is driven by the primary driveshaft via yet another worm wheel.

When used for machining the plurality of notches in either the spool shaft extension or the pinion shaft holders, the orbiting machining spindle is counter-rotated at three times the speed of the workpiece so that the cutting tool engages the workpiece in three discrete locations during each revolution thereof in a manner roughly analogous to the meshing of an imaginary spur gear set comprising hypothetical single and three tooth gears.

The rosettes on the pinion shaft and spool shaft holders are formed with similar apparatus by using a different cutting tool in the machining spindle and reversing the direction of rotation of the orbiting machining spindle to a common rotation direction. Finally, a lifting assembly is provided to position the cutting assembly with respect to the workpiece holding assembly.

BRIEF DESCRIPTION OF THE DRAWINGS

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENT

Figure 1A:
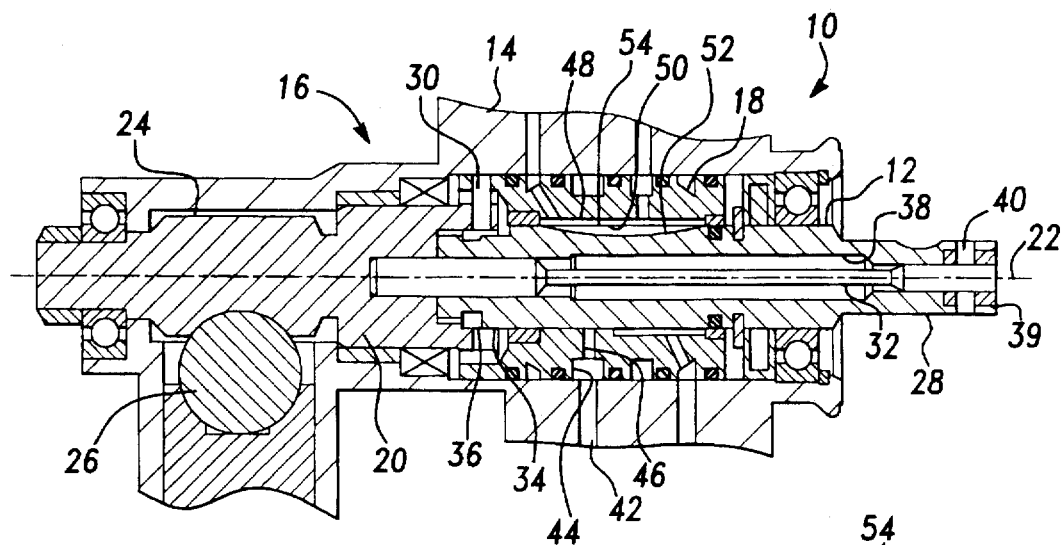
FIG. 1A is a longitudinal partial sectional view of a power steering control valve having spool and pinion shafts formed in accordance with the invention.

With particular reference to FIG. 1A of the drawings, a power steering control valve 10 of the type adapted for use in a vehicular power steering system is thereshown. The power steering control valve 10 includes a spool shaft 12 formed in accordance with the method of the invention as set forth more fully below. Valve housing 14 includes an axial valve chamber in which a control valve 16 comprising the spool shaft 12, a sleeve 18 and a pinion shaft 20 are rotatably supported with reference to a common axis of rotation 22. A pinion gear 24 formed on the far end of the pinion shaft 20 is meshed with a rack 26 of a steering assembly.

The spool shaft 12 is formed with an input portion 28 that is connectable to the vehicle's steering wheel (not shown). The sleeve 18 is linked to the pinion shaft 20 for common rotation via a sleeve drive pin 30. The spool shaft 12 is also elastically connected to the pinion shaft 20 via a torsion bar 32 so that the spool shaft 12 is compliantly rotatable relative to the pinion shaft 20 and therefore the sleeve 18. The angular range of such rotatable motion is limited by stop teeth 34 formed on the spool shaft 12 and a female rosette 36 formed in the pinion shaft 20.

The spool shaft 12 is located axially with respect to the valve housing 14 and sleeve 18 by the torsion bar 32. The torsion bar 32 extends axially through an axial bore 38 in the spool shaft 12 to the pinion shaft 20 within which it is located via interference fit. The spool shaft 12 is affixed to the torsion bar 32 by a pin 40.

Figure 1B:
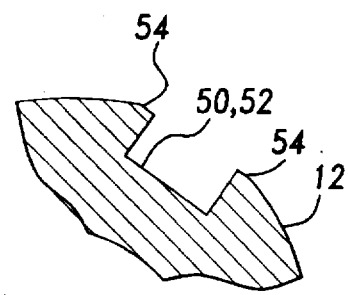
FIG. 1B is a partial sectional view of the spool shaft shown in FIG. 1A.

Hydraulic fluid enters the power steering control valve 10 from a pump delivery line (not shown) and flows through an input port 42 formed in the valve housing 14, and an annular input groove 44 and input ports 46 formed in the sleeve 18. When the spool shaft 12 is tangentially rotated against the torsional resistance provided by the torsion bar 32, hydraulic fluid flow between slots 48 formed in the sleeve 18 and grooves 50 formed in the spool shaft 12 is selectively altered. In addition to an axially extending portion 52, grooves 50 may have a metering ramp 54 which extends normally to the axially extending portion 52 as is shown particularly in FIG. 1B. For a complete description of the operation of an exemplary embodiment of such control valves, see U.S. Pat. No. 5,435,698, which is incorporated by reference herein.

The hydraulic elements of the rotary control valve shown in U.S. Pat. No. 5,435,698 are in part configured in a "closed-center" valving arrangement. However, it will be understood that the spool and pinion shaft construction, and methods disclosed hereinafter are also readily adapted for use in open-centered valving arrangements.

Figure 2:
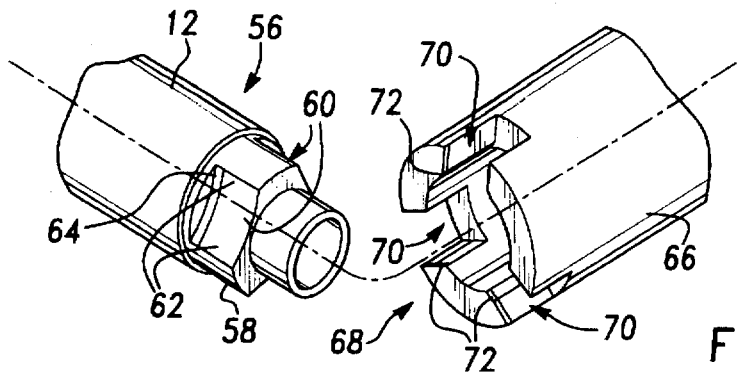
FIG. 2 is a perspective view of notches formed on a spool shaft extension and a rosette formed on a holder therefor in accordance with the invention.

The spool shaft 12 is formed by first forming the concentric features thereof including axial bore 38 and a center 39 at its input portion 28 in a conventional manner. The spool shaft 12 is then inserted in a machining apparatus 100 described below and shown in FIGS. 7 and 8. As best shown in FIG. 2, output end 56 of the spool shaft 12 is therewith formed with a spool shaft extension 58 comprising notches 60. In general the spool shaft extension 58 could be formed with any plurality of notches 60 greater in number than two. Herein the notches 60 are formed with a selected three dimensional geometry comprising three tip portions 62 and uniform root filets 64 of predetermined radius as discussed below particularly with reference to FIG. 4.

As also shown in FIG. 2, spool shaft holders such as spool shaft holder 66 are formed to facilitate indexing and re-indexing for machining and grinding according to the invention. The spool shaft holder 66 is generally cylindrical and has a rosette 68 having three arms 70 comprising seats 72 formed to be complementary to the uniform root filets 64 and tip portions 62 of spool shaft extension 58. The rosette 68 is formed as discussed below with reference to FIG. 5.

Figure 3:
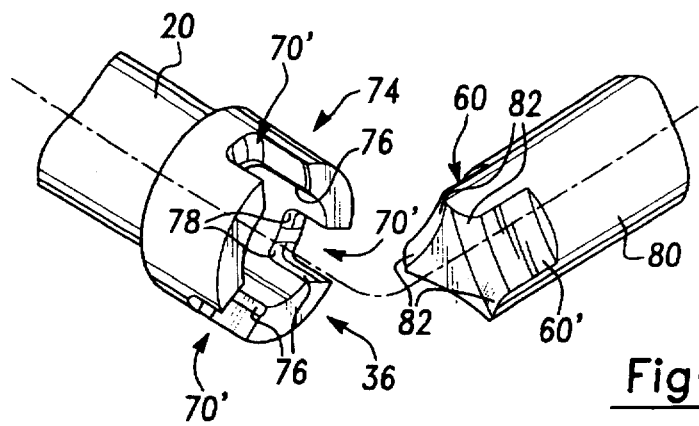
FIG. 3 is a perspective view of a rosette formed on an end of a pinion shaft and notches formed on a holder therefor in accordance with the invention.

The pinion shaft 20 is formed by first forming the concentric features thereof in a conventional manner. The pinion shaft 20 is then inserted in a machining apparatus 100' similar in construction to machining apparatus 100. As shown in FIG. 3, near end 74 of the pinion shaft 20 is formed with the rosette 36 having three arms 70' comprising longitudinal seats 76 and corner seats 78. In general a rosette 36 is similar to the rosette 68 and is formed in a similar manner. However, it is formed slightly larger than rosette 68 thereby allowing some rotational motion of an inserted spool shaft extension 58 before tip portions 62 contact the longitudinal seats 76.

As also shown in FIG. 3, pinion shaft holders such as pinion shaft holder 80 are formed to facilitate indexing and re-indexing for machining and grinding according to the invention. The pinion shaft holder 80 is generally cylindrical and is formed with three notches 60'. In general the notches 60' are similar to the notches 60 and are formed in a similar manner. However, they are formed with corners 82 which are configured to mate with corner seats 78.

An advantage of forming a spool shaft extension 58 comprising the root filets 64 at tip portions 62 on the end of the spool shaft 12, and a pinion shaft 20 comprising the rosette 36 is to enable an improved master indexing method for forming the spool and pinion shafts 12 and 20, respectively, of rotary control valve 16. This indexing method is accomplished with reference to consistent part mounting positions as is discussed below in conjunction with FIGS. 9, 10, 11 and 12. In particular, this indexing method is based on the principle that a first face gear of any given topology (in this case the portions of the root filet 64 juxtaposed to tip portions 62) may be repetitively mounted upon a mating face gear (in this case the mating portions of the corners 82 of the rosette 68) or a series of such mating face gears, with consistent constraints on all six degrees of freedom for the first face gear. For instance, Curvic Couplings manufactured by the Gleason Works of Rochester, N.Y. and Endicon Index Rings manufactured by the Spiriod Division of the Illinois Tool Works, Inc. of Glenview, Ill. are exemplary commercially available mounting hardware items utilizing this principle.

In any case, providing such an improved master indexing method for forming the spool shaft 12 permits a more accurate, and less expensive, method of forming axially extending portions 52 and metering ramps 54 of grooves 50 thereof. As discussed previously, the performance characteristics of hydraulic assist provided by the rotary control valve is a function of the geometry of the edges of axially extending portions 52 and metering ramps 54 of the grooves 50. Advantageously, the grooves 50 are formed with the metering ramps 54 located precisely symmetrical with respect to the edges of the axially extending portions 52. Specifically, repetitively mounting the spool shaft 12 upon the spool shaft holder 66 with the root filets 64 and the corners 82 meshing together is utilized for accurately indexing and re-indexing the spool shaft 12 for all machining operations to be performed upon the spool shaft 12, specifically including machining of the axially extending portions 52 and grinding of the metering ramps 54 of the grooves 50.

Figure 4:
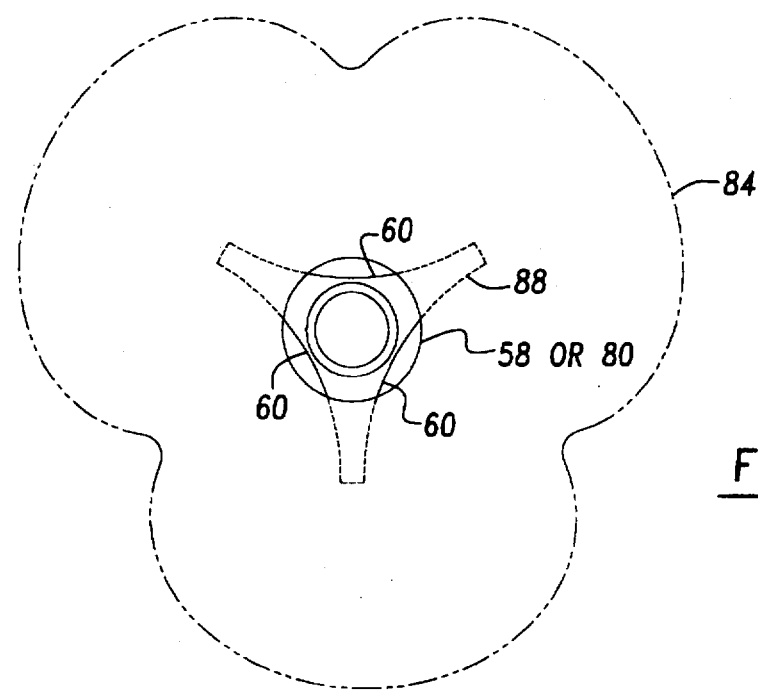
FIG. 4 is an end view of the notches formed on the end of the spool shaft extension shown in FIG. 2.
Figure 7:
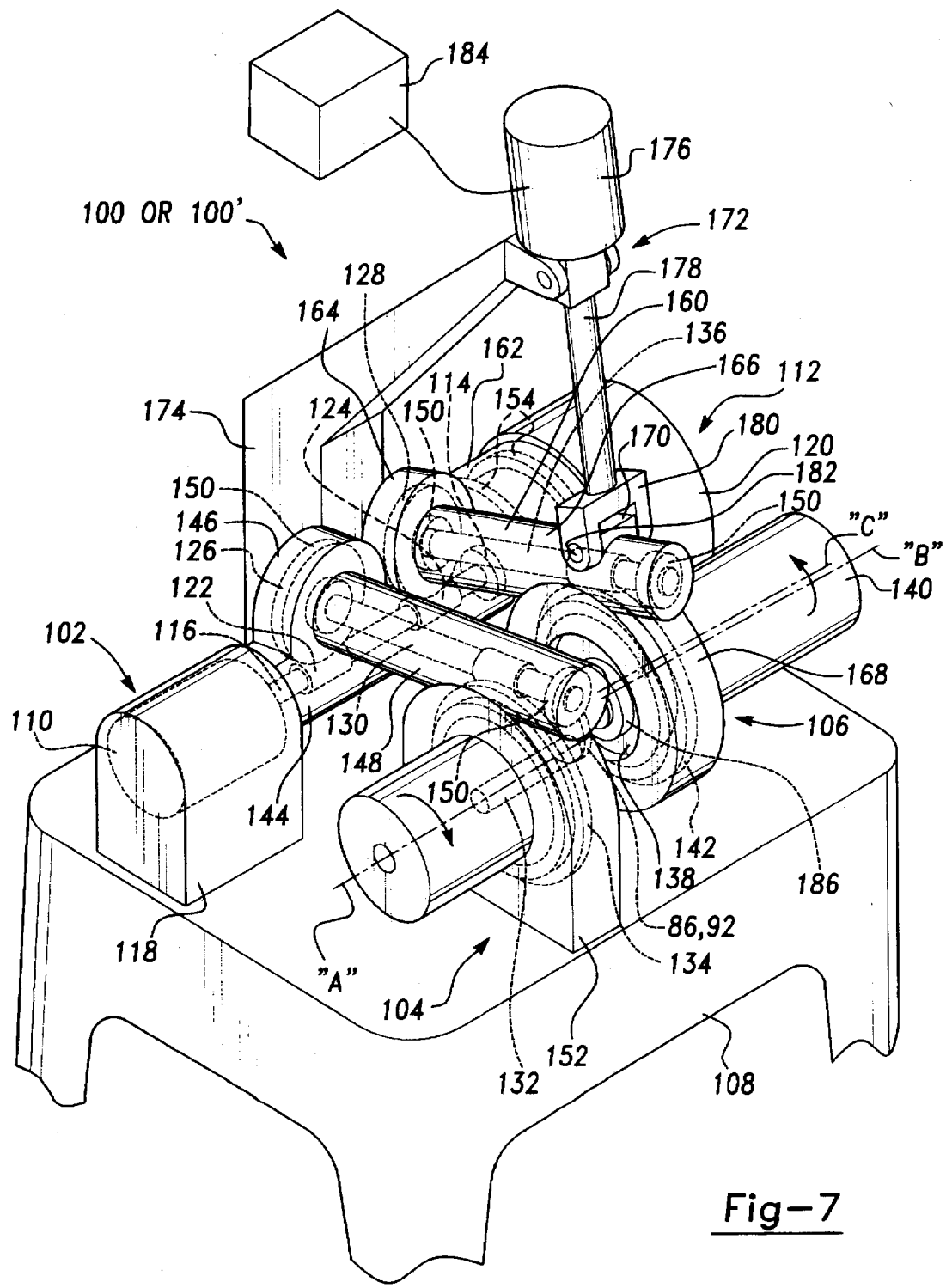
FIG. 7 is a perspective view of a machining apparatus for forming either the notches or the rosette in accordance with the invention.
Figure 8:
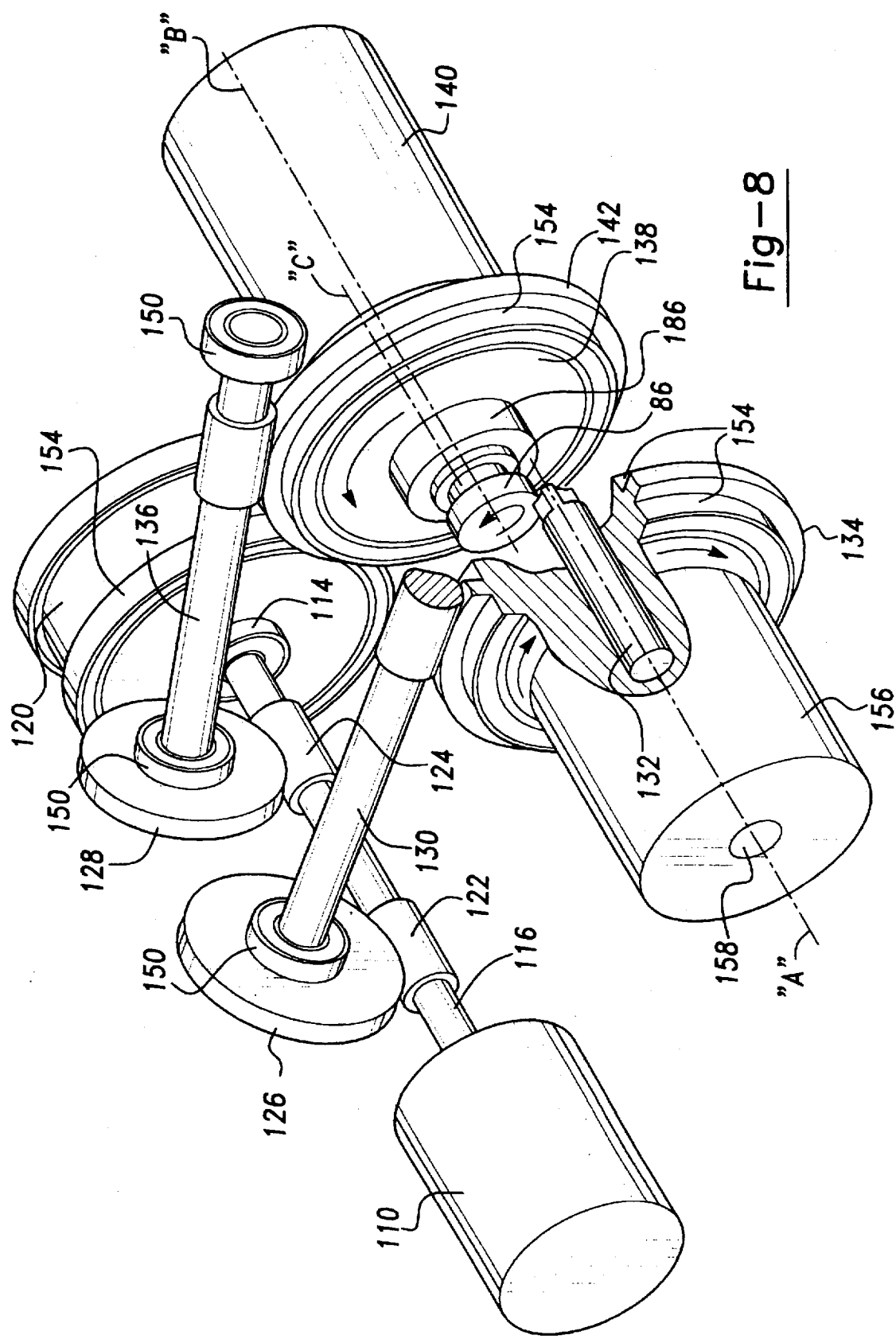
FIG. 8 is a partial cutaway perspective view of the machining apparatus in accordance with the invention.

An exemplary contour for the spool shaft extension 58 or the notches 60' of the pinion shaft holder 80 is shown in FIG. 4. In this view the cutter path 84, as a viewer on spool shaft extension 58 or the pinion shaft holder 80 would see it, is depicted by a curvilinear center line labeled 84. The inside locus of the contour circumscribed by a cutting tool 86 (as depicted in FIGS. 7 and 8 below) is indicated in FIG. 4 by path 88 which comprises notches 60.

Figure 5:
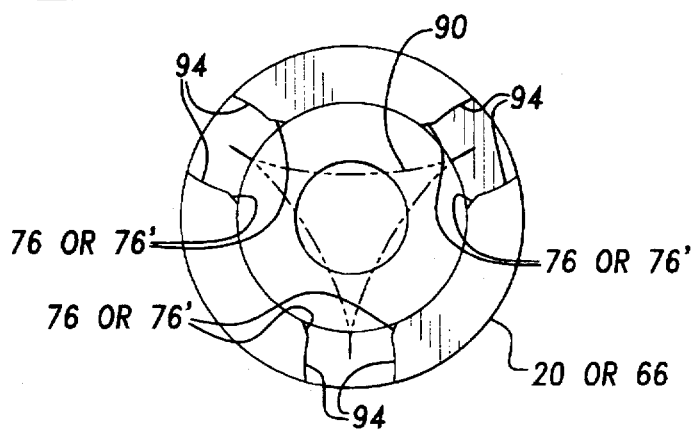
FIG. 5 is an end view of the rosette formed on the end of the pinion shaft shown in FIG. 3.

An exemplary contour for either of the rosettes 36 or 68 is shown in FIG. 5 which is presented in the same scale as FIG. 4. In this view the cutter path 90, as a viewer on pinion shaft 20 or spool shaft holder 66 would see it, is depicted by a curvilinear center line labeled 90. The locus of the contour circumscribed by a cutting tool 92 comprises nominally cylindrical portions 94 as well as the longitudinal seats 76 and similar longitudinal seats 76' of the spool shaft holder 66.

Figure 6:
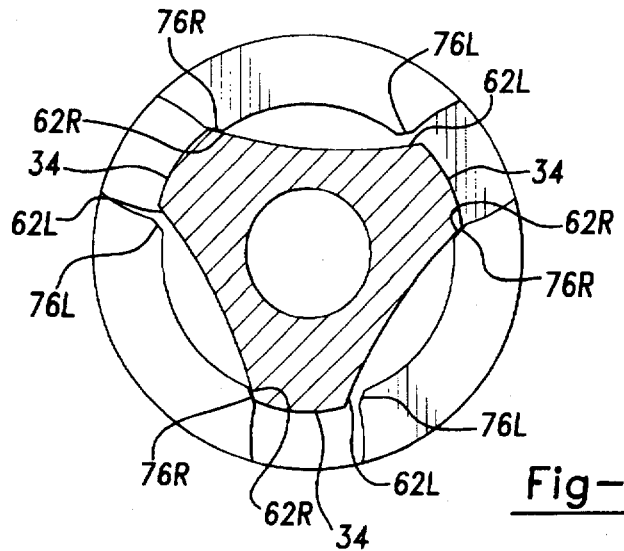
FIG. 6 is a sectional view of the notches formed on the end of the spool shaft when it is inserted in the rosette formed on the end of the pinion shaft.

The tip portions 62 are additionally used as stop teeth 34 with reference to the complementary longitudinal seats 76 of loose fitting rosette 36 formed on pinion shaft 20 as is shown in FIG. 6. In particular, FIG. 6 depicts engagement of rightward going tip portions 62R with rightward going longitudinal seats 76R as in a mechanically implemented right turn. Conversely, leftward going tip portions 62L engage leftward going longitudinal seats 76L in a mechanically implemented left turn.

Utilizing machining apparatus 100 and 100' to form the notches 60 and rosette 36, respectively, (as well as the notches 60' and rosette 68, respectively) enables the improved master indexing method for forming the spool shaft 12 and pinion shaft 20 described above. All machining and grinding of either part is accomplished with reference to sequential engagement with spool shaft holders 66 or pinion shaft holders 80, respectively, for indexing and/or concentric location in each sequentially used machine tool. As shown in FIGS. 7 and 8, either machining apparatus 100 or 100' includes a primary drive assembly 102, a workpiece holder assembly 104, and a movable cutting assembly 106 which are either mounted on, or with reference to, a platform 108.

The primary drive assembly 102 includes a motor 110, support assembly 112 comprising an outboard bearing 114, and a primary drive shaft 116 extending therebetween. The motor 110 is an electric motor that is mounted within a housing 118 which is mounted on the platform 108. One end of the primary drive shaft 116 is mounted to the rotor of the motor 110 and supported for rotation by its internal bearing assembly (not shown) and outboard bearing 114.

The support assembly 112 includes a housing 120 which is mounted to the platform 108. The outboard bearing 114 is mounted within the housing 120 to support the primary drive shaft 116 as it is rotated by the motor 110. The periphery of primary drive shaft 116 is formed with first and second worm portions 122 and 124, respectively, in meshing contact with a pair of worm wheels 126 and 128, respectively. The worm wheel 126 turns a fine worm shaft 130 for turning a workpiece 132 via fine worm wheel 134 in the workpiece holder assembly 104. The worm wheel 128 turns a coarse worm shaft 136 for turning a machining spindle mounting plate 138 comprised in the cutting assembly 106 upon which an orbiting machining spindle 140 is mounted via coarse worm wheel 142.

Specifically depicted in FIGS. 7 and 8 is the case of forming the notches 60 or 60' with machining apparatus 100. This requires rotation of the machining spindle mounting plate 138 in a direction counter to that of the workpiece 132 (i.e., spool shaft 12) at precisely three times its rotational speed. The cutting tool 86 is mounted in the orbiting machining spindle 140 for forming the spool shaft extension 58 in the manner shown in FIGS. 2 and 4. This is accomplished as the workpiece 132 and orbiting machining spindle 140 concomitantly rotate in opposing directions with a one-to-three speed ratio.

The requirement for turning the orbiting machining spindle 140 in a direction counter to that of the workpiece 132 at precisely three times its rotational speed can be met as follows: Fine worm shaft 130 and fine worm wheel 134 are chosen as a single start right hand worm gear set, and coarse worm shaft 136 and coarse worm wheel 142 are chosen as a three start left hand worm gear set.

Forming the rosettes 36 or 68 is accomplished with machining apparatus 100', modified from machining apparatus 100 by rotating the machining spindle mounting plate 138 in the same direction as that of the workpiece 132 (i.e., in this case pinion shaft 20) at precisely three times its rotational speed. This requires a significantly smaller cutting tool 92 mounted in high speed version of the orbiting machining spindle 140 for forming the rosette 36 in the manner shown in FIGS. 3 and 5. This is accomplished as the pinion shaft 20 and orbiting machining spindle 140 concomitantly rotate in the same direction with a one-to-three speed ratio.

The requirement for turning the orbiting machining spindle 140 in the same direction as that of workpiece 132 at precisely three times its rotational speed can be met as follows: Fine worm shaft 130 and fine worm wheel 134 are chosen as a single start right hand worm gear set, and course worm shaft 136 and course worm wheel 142 are chosen as a three start right hand worm gear set.

As shown in FIG. 7, the primary drive shaft 116 is supported within a fixed cylindrical shaft housing 144 extending from the motor 110. A gear housing 146 is fixedly mounted to the cylindrical shaft housing 144 to house the worm wheel 126. A cylindrical housing 148 is fixedly mounted to the gear housing 146 and supports the fine worm shaft 130 and worm wheel 126 via a pair of bearings 150. The workpiece holder assembly 104 includes a housing 152 mounted on the platform 108 and attached to the cylindrical housing 148.

As best shown in FIG. 8, a pair of bearings 154 are mounted in the housing 152 to support the fine worm wheel 134. A workpiece holder 156 is mounted to rotate with the fine worm wheel 134. The workpiece holder 156 includes a bore 158 extending axially along axis "A" through the workpiece holder 156 for receiving the workpiece 132. A clamping subassembly (not shown) is mounted within the workpiece holder 156 to hold the workpiece 132 in position for machining. The workpiece 132 may be inserted into position by passing it through the bore 158 from the bore's outer end until the workpiece 132 is in proper position for machining by the cutting assembly 106. The clamping subassembly is then activated to engage the workpiece 132 so that it rotates with the workpiece holder 156 and fine worm wheel 134.

As shown in FIGS. 7 and 8, the worm wheel 128 and coarse worm shaft 136 for driving the cutting assembly 106 are mounted in a housing 160. The housing 160 includes a sleeve 162 which extends to overlap the inside end of the housing 120. A pair of the bearings 154 are mounted upon the inside end of the housing 120 to support the sleeve 162 and housing 160 for concentric rotation around the primary drive shaft 116. The housing 160 also comprises a gear housing 164 for housing the worm wheel 128 and a cylindrical housing 166 for supporting the coarse worm shaft 136 via two more of the bearings 150. Further, the housing 160 also comprises a cutting assembly housing 168 and a lifting boss 170 so that a lifting assembly 172 is operable to position the housing 160 pivotably about the primary drive shaft 116. This enables positioning of the cutting assembly 106, and thus the orbiting machining spindle 140, to and away from the workpiece 132 by the lifting assembly 172.

As best shown in FIG. 8, another pair of bearings 154 are mounted in the cutting assembly housing 168 to support the coarse worm wheel 142. The machining spindle mounting plate 138 is mounted therewithin to rotate with the coarse worm wheel 142. The machining spindle mounting plate 138 is adapted to eccentrically mount the orbiting machining spindle 140 and cutting tools 86 or 92 for orbital rotational motion with reference to the cutting assembly housing 168.

The lifting assembly 172 includes an arm 174 extending from the platform 108. An actuator 176, such as a gear motor, shaft angle encoder and lead screw-nut assembly (detail not shown), is activated to reciprocally move a rod 178 attached to a yoke 180 which positions the lifting boss 170 of the housing 160 via pin 182. The actuator 176 of the lifting assembly 172 is operable to precisely locate the cutting assembly housing 168, and thus the cutting assembly 106, with respect to the workpiece 132 positioned in the workpiece holder assembly 104. A remote control unit 184 controls the position of the cutting assembly 106.

As shown in FIGS. 7 and 8, the pair of bearings 154 mounted in cutting assembly 106 support the coarse worm wheel 142 and machining spindle mounting plate 138 which turn about a primary axis "B". The orbiting machining spindle 140 is eccentrically mounted along a secondary axis "C" of the machining spindle mounting plate 138 and carries a chuck 186 for holding the cutting tools 86 or 92.

With reference to forming either the notches 60 on spool shaft extension 58 or the notches 60' on pinion shaft holder 80, the above noted one-to-three turning ratio in opposing directions is used. The axis "B" is offset a radius R from the axis "A", the axis "C" is offset a radius r from the axis "B" and a relatively large diameter d cutting tool 86 is utilized, as shown in FIG. 8. An actual path followed by the axis "C" relative to the axis "A" for an exemplary set of notches 60 is determined by the following transcendental equations:

$$X=44 \cos \theta - 7.2 \cos (4\theta+\pi/2) \text{ and}$$

$$Y=44 \sin \theta - 7.2 \sin (4\theta+\pi/2)$$

wherein R=44 mm, r=7.2 mm, the value $\theta$ is apparent rotation of the axis "B" with respect to the workpiece 132, the value 4 is apparent rotation of the axis "C" with respect to the workpiece 132 (i.e., the sum of three turns and one turn) and d=60 mm. As explained above, it is necessary to provide a slightly larger tip geometry on the pinion shaft holder 80. This may be accomplished on the same machining apparatus 100 by concomitantly increasing the radius R slightly (i.e., as with the actuator 176) and using a slightly smaller diameter d for the cutting tool 86.

With reference to forming either of the rosettes 36 or 68, the above noted one-to-three turning ratio in the same directions is used. In this case, the axis "B" is offset a radius R' from the axis "A", the axis "C" is offset a radius r' from the axis "B" and a relatively small diameter d' cutting tool 92 is utilized. An actual path followed by the axis "C" relative to the axis "A" for an exemplary rosette 36 used on a pinion shaft 14 is determined by the following transcendental equations:

$$X=8 \cos \theta - 4.5 \cos (2\theta''+\pi/2) \text{ and}$$

$$Y=8 \sin \theta + 4.5 \sin (2\theta''+\pi/2)$$

wherein R'=8 mm, r'=4.5 mm, the value $\theta'$ is apparent rotation of the axis "B" with respect to the pinion shaft 20, the value 2 is apparent rotation of the axis "C" with respect to the pinion shaft 20 (i.e., this time the difference between three turns and one turn) and d'=7 mm. As explained above it is necessary to provide a slightly smaller rosette 68 for the spool shaft holder 66. This may be accomplished on the same machining apparatus 100' by concomitantly decreasing the radius R' slightly (i.e., as with the actuator 176) and using a slightly smaller diameter d' for the cutting tool 92.

Figure 9:
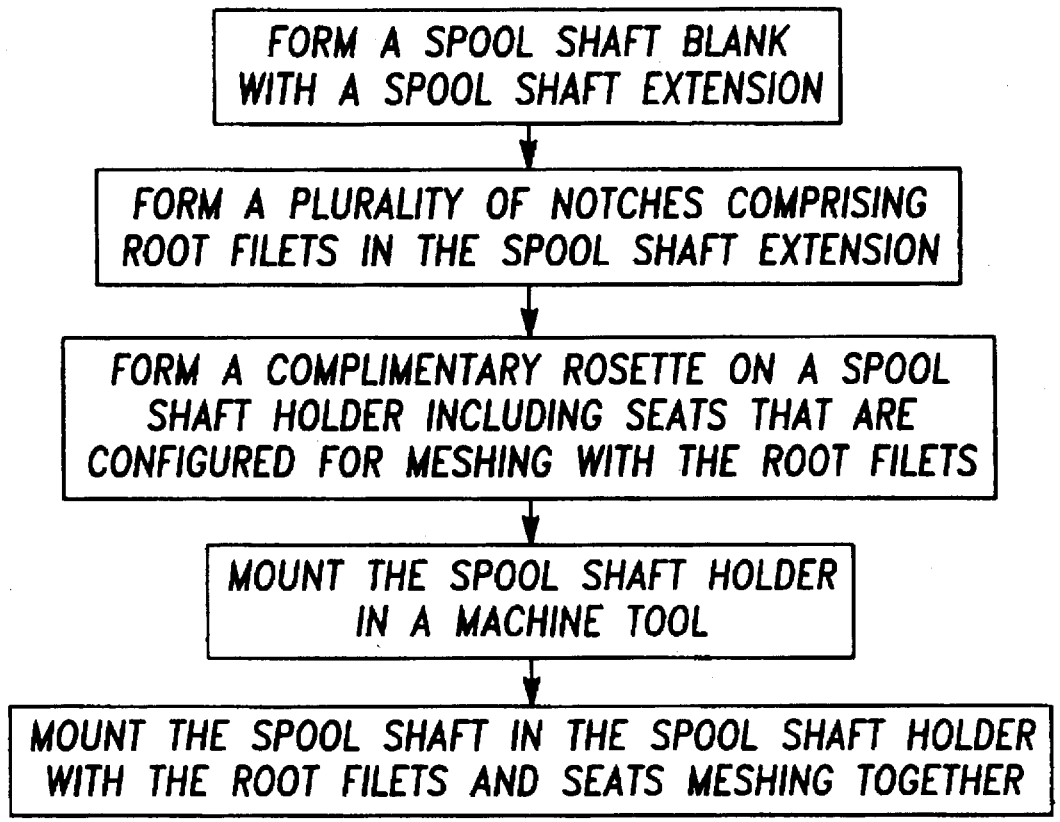
FIG. 9 is a flow chart showing the steps of the method of indexing a spool shaft in accordance with the invention.

Depicted in FIG. 9 is a method of indexing a spool shaft 12 for a power steering control valve 10 in a machine tool used for performing a machining operation thereon in accordance with the invention. The method includes the steps of forming a spool shaft blank comprising a spool shaft extension 58 extending from one end thereof, forming a plurality of notches 60 comprising root filets 64 in the spool shaft extension 58, forming a complementary rosette 68 comprising seats 72 configured for meshing with the root filets 64 on a spool shaft holder 66, mounting the spool shaft holder 66 in the machine tool, and mounting the spool shaft 12 in the spool shaft holder 66 with the root filets 64 and seats 72 meshing together.

Figure 10:
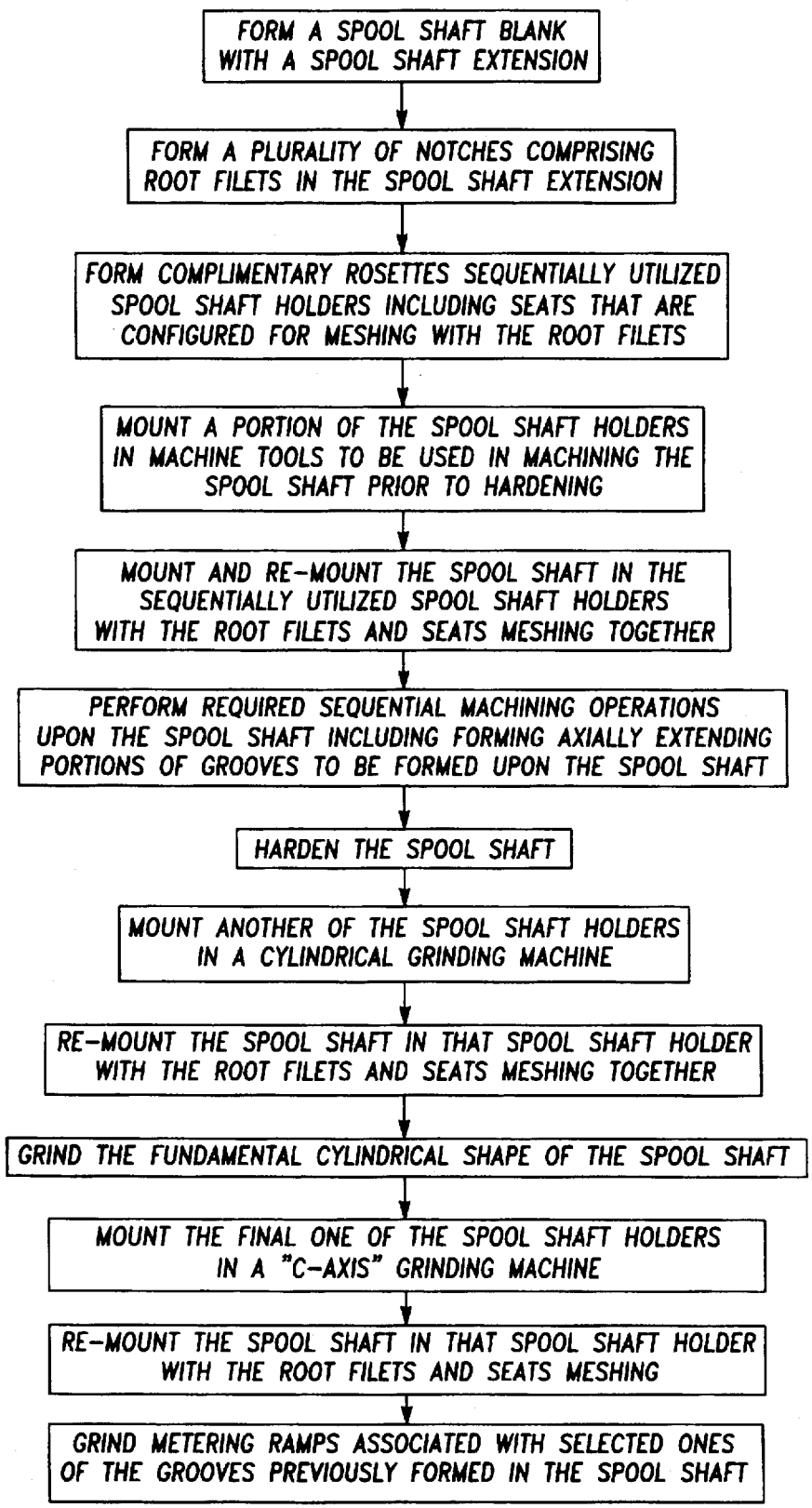
FIG. 10 is a flow chart showing the steps of the method of forming a spool shaft in accordance with the invention.

Depicted in FIG. 10 is a method of forming a spool shaft 12 for a power steering control valve 10 in accordance with the invention. The method includes the steps of forming a spool shaft blank comprising a spool shaft extension 58 extending from one end thereof, forming a plurality of notches 60 comprising a root filets 64 in the spool shaft extension 58, forming complementary rosettes 68 comprising seats 72 configured for meshing with the root filets 64 on sequentially utilized spool shaft holders 66, mounting a portion of the spool shaft holders 66 in machine tools to be used in machining the spool shaft 12 prior to hardening, mounting and re-mounting the valve spool shaft 12 in the sequentially utilized spool shaft holders 66 with the root filets 64 and seats 72 meshing together, performing required sequential machining operations upon the spool shaft 12 including forming the axially extending portions 52 of the grooves 50, hardening the spool shaft 12, mounting another of the spool shaft holders 66 in a cylindrical grinding machine, re-mounting the spool shaft 12 in that spool shaft holder 66 with the root filets 64 and seats 72 meshing together, grinding the fundamental cylindrical shape of the spool shaft 12, mounting the final one of the spool shaft holders 66 in a "C-axis" grinding machine, re-mounting the spool shaft 12 in that spool shaft holder 66 with the root filets 64 and seats 72 meshing together, and finally, grinding metering ramps 54 associated with selected ones of the grooves 50 previously formed on the spool shaft 12.

Figure 11:
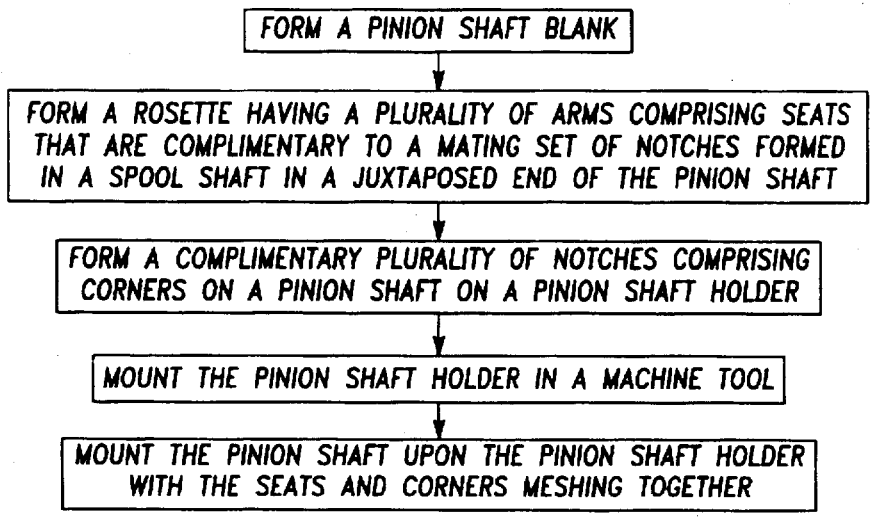
FIG. 11 is a flow chart showing the steps of the method of indexing a pinion shaft in accordance with the invention.

Depicted in FIG. 11 is a method of indexing a complementary pinion shaft 20 for a power steering control valve 10 in a machine tool used for performing a machining operation thereon in accordance with the invention. The method includes the steps of forming a pinion shaft blank, forming a rosette 36 having a plurality of arms 70' comprising corner seats 78 that are complementary to a mating set of notches formed upon a spool shaft in the near end 74 of the pinion shaft 20, forming a complementary plurality of notches 60' comprising corners 82 on a pinion shaft holder 80, mounting the pinion shaft holder 80 in the machine tool, and mounting the pinion shaft upon the pinion shaft holder 80 with the corner seats 78 and corners 82 meshing together.

Figure 12:
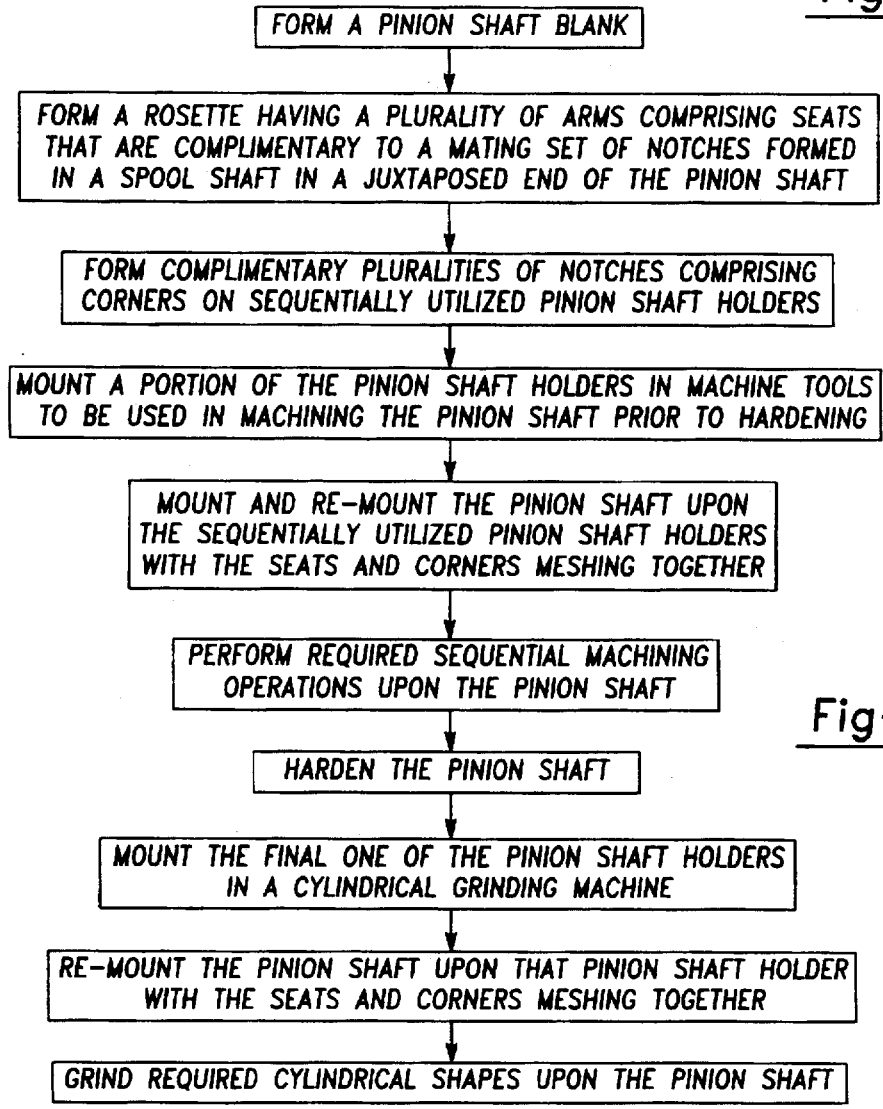
FIG. 12 is a flow chart showing the steps of the method of forming a pinion shaft in accordance with the invention.

Depicted in FIG. 12 is a method of forming a complementary pinion shaft 20 for a power steering control valve 10 in accordance with the invention. The method includes the steps of forming a pinion shaft blank, forming a rosette 36 having a plurality of arms 70' comprising corner seats 78 that are complementary to a mating set of notches formed upon a spool shaft in a near end 74 of the pinion shaft 20, forming complementary pluralities of notches 60' comprising corners 82 on sequentially utilized pinion shaft holders 80, mounting a portion of the pinion shaft holders 80 in machine tools to be used in machining the pinion shaft 20 prior to hardening, mounting and re-mounting the pinion shaft 20 upon the sequentially utilized pinion shaft holders with the corner seats 78 and corners 82 meshing together, performing required sequential machining operations upon the pinion shaft 20, hardening the pinion shaft 20, mounting the final one of the pinion shaft holders 80 in a cylindrical grinding machine, re-mounting the pinion shaft 20 upon that pinion shaft holder with the corner seats 78 and corners 82 meshing together, and grinding required cylindrical shapes upon the pinion shaft 20.

Having described my invention, many modifications thereto will become apparent to those skilled in the art to which it pertains without deviation from the spirit of the invention as defined by the scope of the appended claims.

I claim:

1. A rotary control valve for use in a hydro-mechanical system, said valve comprising:

a housing;

a sleeve rotatably mounted within said housing; and a spool shaft mounted within said sleeve and having an end having an extended portion having a circumferential outer surface, said extended portion having a plurality of circumferential notches spaced equidistantly apart, each of said plurality of notches having a continuous curvalinear surface extending a predetermined distance between a pair of edges formed with said circumferential outer surface, said sleeve and spool shaft rotatable with respect to each other to control the passage of fluid through said valve;

a pinion shaft mounted in said housing and having a near end having a plurality of arms defining a loose fitting complementary recess adapted to receive said plurality of circumferential notches therein, each of said plurality of arms having a pair of stop teeth.

2. The valve of claim 1, wherein each of said plurality of notches has a pair of axially aligned tip portions, and wherein said pair of stop teeth is a pair of spaced apart longitudinal seats, one of said longitudinal seats contacting one of said pair of tip portions when said spool shaft is rotated sufficiently with respect to said pinion shaft.

3. The valve of claim 2, wherein each of said plurality of notches has a root fillet extending in a direction normal to said axis of said spool shaft.

* * * * *